United States Patent
Tan et al.

(10) Patent No.: US 10,598,947 B2
(45) Date of Patent: Mar. 24, 2020

(54) THREE-DIMENSIONAL DISPLAY PANEL, THREE-DIMENSIONAL DISPLAY APPARATUS HAVING THE SAME, AND FABRICATING METHOD THEREOF

(71) Applicant: BOE TECHNOLOGY GROUP CO., LTD., Beijing (CN)

(72) Inventors: Jifeng Tan, Beijing (CN); Xiaochuan Chen, Beijing (CN); Yafeng Yang, Beijing (CN); Jian Gao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/560,690

(22) PCT Filed: Sep. 20, 2016

(86) PCT No.: PCT/CN2016/099446
§ 371 (c)(1),
(2) Date: Sep. 22, 2017

(87) PCT Pub. No.: WO2018/053684
PCT Pub. Date: Mar. 29, 2018

(65) Prior Publication Data
US 2018/0252932 A1    Sep. 6, 2018

(51) Int. Cl.
*G02B 27/22* (2018.01)
*G02F 1/1335* (2006.01)
(Continued)

(52) U.S. Cl.
CPC ..... *G02B 27/2214* (2013.01); *G02B 27/2235* (2013.01); *G02F 1/133514* (2013.01);
(Continued)

(58) Field of Classification Search
CPC ......... G02F 1/133514; G02F 1/134309; G02F 2201/123; G02F 1/133553;
(Continued)

(56) References Cited

U.S. PATENT DOCUMENTS

2004/0184146 A1    9/2004  Uehara et al.
2009/0257119 A1*  10/2009  Uehara .............. G02B 27/2214
                                                    359/463
(Continued)

FOREIGN PATENT DOCUMENTS

CN    101149487 A    3/2008
CN    104238127 A    12/2014

OTHER PUBLICATIONS

International Search Report & Written Opinion dated Jun. 28, 2017 regarding PCT/CN2016/099446.

*Primary Examiner* — Jade R Chwasz
(74) *Attorney, Agent, or Firm* — Intellectual Valley Law, P.C.

(57) ABSTRACT

A three-dimensional display panel includes a first display substrate having a plurality groups of M pixels, the first display substrate being a reflective display substrate; a second display substrate facing the first display substrate, the second display substrate being a transparent display substrate; and a lens array layer on a side of the second display substrate distal to the first display substrate having a plurality of lenses capable of directing light reflected by each of the M pixels into one of N view zones on a side of the lens array layer distal to the second display substrate; M is an integer ≥2; N is an integer ≥2.

11 Claims, 10 Drawing Sheets

(51) Int. Cl.
  *G09G 3/00* (2006.01)
  *G02F 1/1343* (2006.01)
  *H04N 13/305* (2018.01)
  *F21V 8/00* (2006.01)

(52) U.S. Cl.
  CPC ....... *G02F 1/134309* (2013.01); *G09G 3/003* (2013.01); *H04N 13/305* (2018.05); *G02B 6/0053* (2013.01)

(58) Field of Classification Search
  CPC .. G02B 27/0172; G02B 6/005; G02B 6/0055; G02B 2027/014; G02B 27/0977; G02B 27/2292; G02B 5/124; G02B 27/2214; G02B 27/22; G02B 27/2235; H04N 13/305; G09G 3/003
  USPC ................................ 359/462, 463, 466, 471
  See application file for complete search history.

(56) References Cited

U.S. PATENT DOCUMENTS

| | | | |
|---|---|---|---|
| 2012/0038751 A1* | 2/2012 | Yuan | H04N 5/23232 348/51 |
| 2013/0063969 A1* | 3/2013 | Neugebauer | G02B 6/0036 362/603 |
| 2014/0049983 A1* | 2/2014 | Nichol | G02B 6/0018 362/610 |
| 2014/0133023 A1* | 5/2014 | Park | G02B 27/2214 359/463 |
| 2016/0252738 A1 | 9/2016 | Wei | |

* cited by examiner

THREE-DIMENSIONAL DISPLAY PANEL, THREE-DIMENSIONAL DISPLAY APPARATUS HAVING THE SAME, AND FABRICATING METHOD THEREOF

CROSS-REFERENCE TO RELATED APPLICATION

This application is a national stage application under 35 U.S.C. § 371 of International Application No. PCT/CN2016/099446, filed Sep. 20, 2016, the contents of which are incorporated by reference in the entirety.

TECHNICAL FIELD

The present invention relates to display technology, more particularly, to a three-dimensional display panel, a three-dimensional display apparatus having the same, and a fabricating method thereof.

BACKGROUND

Typically, three-dimensional image display may be achieved based on the principle of stereo-vision via an observer's eyes. Specifically, in three-dimensional image display, the observer's left and right eyes view two different two-dimensional images, respectively. Two different two-dimensional images are transmitted to the brain simultaneously, giving the impression of a real 3-dimensional image. Recently, three-dimensional display apparatuses have become a focus of research in display technology. For example, three-dimensional view eyeglasses have been developed for generating three-dimensional (3D) image when viewing movies and televisions.

SUMMARY

In one aspect, the present invention provides a three-dimensional display panel comprising a first display substrate having a plurality groups of M pixels, the first display substrate being a reflective display substrate; a second display substrate facing the first display substrate, the second display substrate being a transparent display substrate; and a lens array layer on a side of the second display substrate distal to the first display substrate comprising a plurality of lenses capable of directing light reflected by each of the M pixels into one of N view zones on a side of the lens array layer distal to the second display substrate; M is an integer ≥2; N is an integer ≥2.

Optionally, the lens array layer is configured so that incident light from a light source along an incident light direction is refracted by the lens array layer, light transmitted through the lens array layer transmits along a refracted light direction and is subsequently reflected by the first display substrate for image display; and a first angle between the refracted light direction and a normal line to a reflective surface of the first display substrate is smaller than a second angle between the incident light direction and the normal line.

Optionally, M=N, the light reflected by each of the M pixels is directed into a corresponding view zone.

Optionally, M=N=2, the first display substrate includes a plurality pairs of adjacent first pixel and second pixel, and the lens array layer is configured to direct light reflected by a first pixel into a first view zone and direct light reflected by a second pixel into a second view zone.

Optionally, each lens of the plurality of lenses corresponds to L groups of M pixels, L is an integer ≥1; each lens of the plurality of lenses is configured to direct light reflected by a m-th pixel in each of L groups of M pixels into a n-th view zone; 1≤m≤M. and 1≤n≤N.

Optionally, M=N, each lens of the plurality of lenses is configured to direct light reflected by a m-th pixel in each of L groups of M pixels into a corresponding view zone; 1≤m≤M.

Optionally, M=N=2; each lens of the plurality of lenses corresponds to L groups of a plurality pairs of adjacent first pixel and second pixel, and the lens array layer is configured to direct light reflected by a first pixel in each pair of adjacent first pixel and second pixel in each of the L groups into a first view zone and direct light reflected by a second pixel in each pair of adjacent first pixel and second pixel in each of the L groups into a second view zone.

Optionally, M=N=2, each lens of the plurality of lenses corresponds to a plurality pairs of first pixel and second pixel, and each lens of the plurality of lenses is configured to direct light reflected by first pixels in the plurality pairs into a first view zone, and direct light reflected by second pixels in the plurality pairs into a second view zone.

Optionally, L=3, M=N=2, each lens of the plurality of lenses corresponds to three pairs of first pixel and second pixel, and each lens of the plurality of lenses is configured to direct light reflected by first pixels in the three pairs of first pixel and second pixel into a first view zone, and direct light reflected by second pixels in the three pairs of first pixel and second pixel into a second view zones.

Optionally, the lens array layer is an electrically driven liquid crystal lens array layer sandwiched between and driven by a first electrode layer and a second electrode layer connected to a driving circuit.

Optionally, the three-dimensional display panel further comprises a light guide plate for providing incident light to the first display substrate.

Optionally, the light guide plate comprises a plurality of regions having different light extraction angles; and the lens array layer comprises a plurality of lenses having different radii of curvature corresponding to the plurality of regions having different light extraction angles.

Optionally, the three-dimensional display panel is configured to use ambient light for providing incident light to the first display substrate when ambient light intensity is equal to or higher than a threshold value, and use the light guide plate for providing incident light to the first display substrate when ambient light intensity is below the threshold value.

Optionally, each of the M pixels comprises a single subpixel.

Optionally, each of the M pixels comprises a plurality of subpixels of different colors.

Optionally, each of the plurality of lenses has a radius of curvature r according to a following equation:

$$r = \frac{tl(n_2 - n_1)}{n_1 e};$$

wherein t is a pixel width of each of the M pixels; l is a normal distance between the N view zones and the lens array layer; e is a distance between two adjacent view zones; $n_1$ is a refractive index of each of the plurality of lenses; and $n_2$ is a refractive index of a medium on a side of the lens array layer distal to the second display substrate.

Optionally, each of the plurality of lenses has a lens pitch p according to a following equation:

$$\frac{N*e*t}{e+t} - \frac{(N*e*t^2)/w}{e+t} < p < \frac{N*e*t}{e+t} + \frac{(N*e*t^2)/w}{e+t};$$

wherein e is a distance between two adjacent view zones; t is a pixel width of each of the M pixels; and w is a width of the plurality groups of M pixels.

Optionally, each of the plurality of lenses has a lens pitch p according to a following equation:

$$p = \frac{N*e*t}{e+t};$$

wherein e is a distance between two adjacent view zones; and t is a pixel width of each of the M pixels.

Optionally, each of the plurality of lenses has a thickness d according to a following equation;

$$d = \frac{n_2 r}{n_2 - n_1} - \frac{n_2 s}{n_1};$$

wherein r is a radius of curvature of each of the plurality of lenses; s is a normal distance between the lens array layer and the first display substrate; $n_1$ is a refractive index of each of the plurality of lenses; and $n_2$ is a refractive index of a medium on a side of the lens array layer distal to the second display substrate.

In another aspect, the present invention provides a method of fabricating a three-dimensional display panel, comprising forming a first display substrate having a plurality groups of M pixels, the first display substrate being a reflective display substrate; forming a second display substrate facing the first display substrate, the second display substrate being a transparent display substrate; and forming a lens array layer on a side of the second display substrate distal to the first display substrate, the lens array layer comprising a plurality of lenses capable of directing light reflected by each of the M pixels into one of N view zones on a side of the lens array layer distal to the second display substrate; M is a positive integer ≥2; N is a positive integer ≥2.

Optionally, the step of forming the lens array layer comprises forming a first electrode layer and a second electrode layer; and forming an electrically driven liquid crystal lens array layer sandwiched between the first electrode layer and the second electrode layer.

Optionally, the method further comprises forming a light guide plate on a side of the second display substrate distal to the first display substrate.

Optionally, the step of forming the light guide plate comprises forming a plurality of regions having different light extraction angles in the light guide plate; and the step of forming the lens array layer comprises forming a plurality of lenses having different radii of curvature corresponding to the plurality of regions.

In another aspect, the present invention provides a three-dimensional display apparatus comprising a three-dimensional display panel described herein or fabricated by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Conventional reflective liquid crystal display panels typically include a thin film transistor substrate, a color filter substrate, and a front light guide plate on a side of the color filter substrate distal to the thin film transistor substrate. When ambient light intensity is high, the conventional reflective liquid crystal display panels use ambient as light source for image display. When ambient light intensity is low, the front light guide is turned on as light source for image display. Conventional reflective liquid crystal display panels have several disadvantages. First, when ambient light intensity is use as light source, only a reflectivity of approximately 30% may be achieved in the display panel. Second, when the front light guide is used as light source for image display, an even lower reflectivity may be achieved because extraction angles of the front light guide is relatively large.

Figure 1:
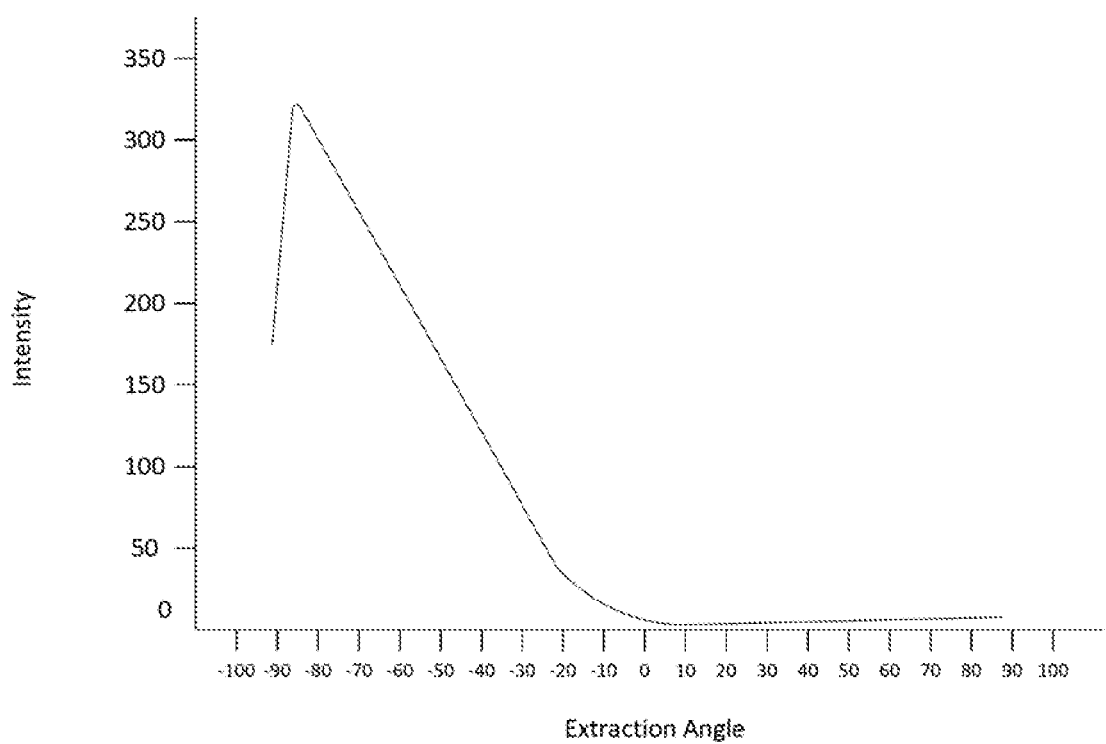
FIG. 1 shows distribution of extraction angles of a front light guide in some embodiments.
Figure 2:
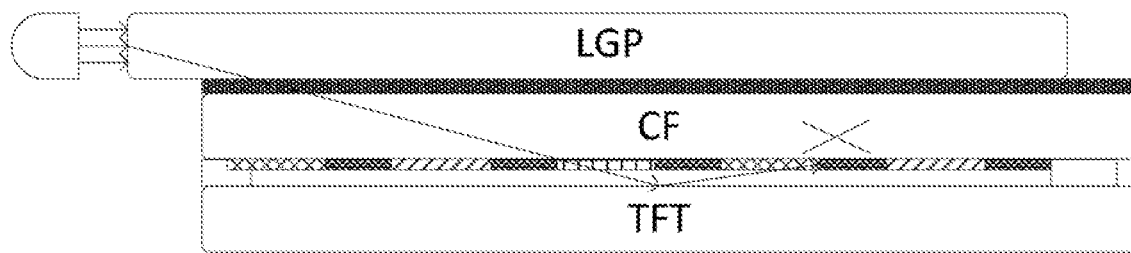
FIG. 2 illustrates a light path in a conventional reflective display panel.

FIG. 1 shows distribution of extraction angles of a front light guide in some embodiments. As shown in FIG. 1, a majority of light emitted from the front light guide has an extraction angle larger than 60 degrees, with a peak value at around 85 degrees. FIG. 2 illustrates a light path in a conventional reflective display panel. As shown in FIG. 2, light emitted from the front light guide plate LGP having a large extraction angle enters the color filter substrate CF, and is reflected by a reflective film (e.g., a reflective electrode) on the thin film transistor substrate TFT. The reflected light gets absorbed inside the display panel, e.g., by the color filter and polarizer, rather than emits out of the display panel for image display.

Accordingly, the present disclosure provides a novel reflective display panel and a method of fabricating the same that substantially obviate one or more of the problems due to limitations and disadvantages of the related art. In one aspect, the present disclosure provides a reflective display panel. The present display panel may be any appropriate types of display panel, e.g., a liquid crystal display panel, an electronic ink display panel, an organic light emitting display panel. In some embodiments, the display panel includes a first display substrate having a plurality groups of M pixels, the first display substrate being a reflective display substrate; a second display substrate facing the first display substrate, the second display substrate being a transparent display substrate; and a lens array layer on a side of the second display substrate distal to the first display substrate. The lens array layer includes a plurality of lenses for directing light reflected by each of the M pixels into one of N view zones on a side of the lens array layer distal to the second display substrate; M is a positive integer ≥2; N is a positive integer ≥2. Optionally, the display panel further includes a liquid crystal layer sandwiched between the first display substrate and the second display substrate.

In some embodiments, the present display panel is a three-dimensional display panel. Accordingly, a plurality of views observable in the N view zones may be used to present a three-dimensional image. For examples, in some embodiments, the plurality of views includes two views, e.g., a left eye view and a right eye view observable in a left eye view zone and a right eye view zone, respectively. Optionally, the plurality of views includes more than two views.

Figure 3:
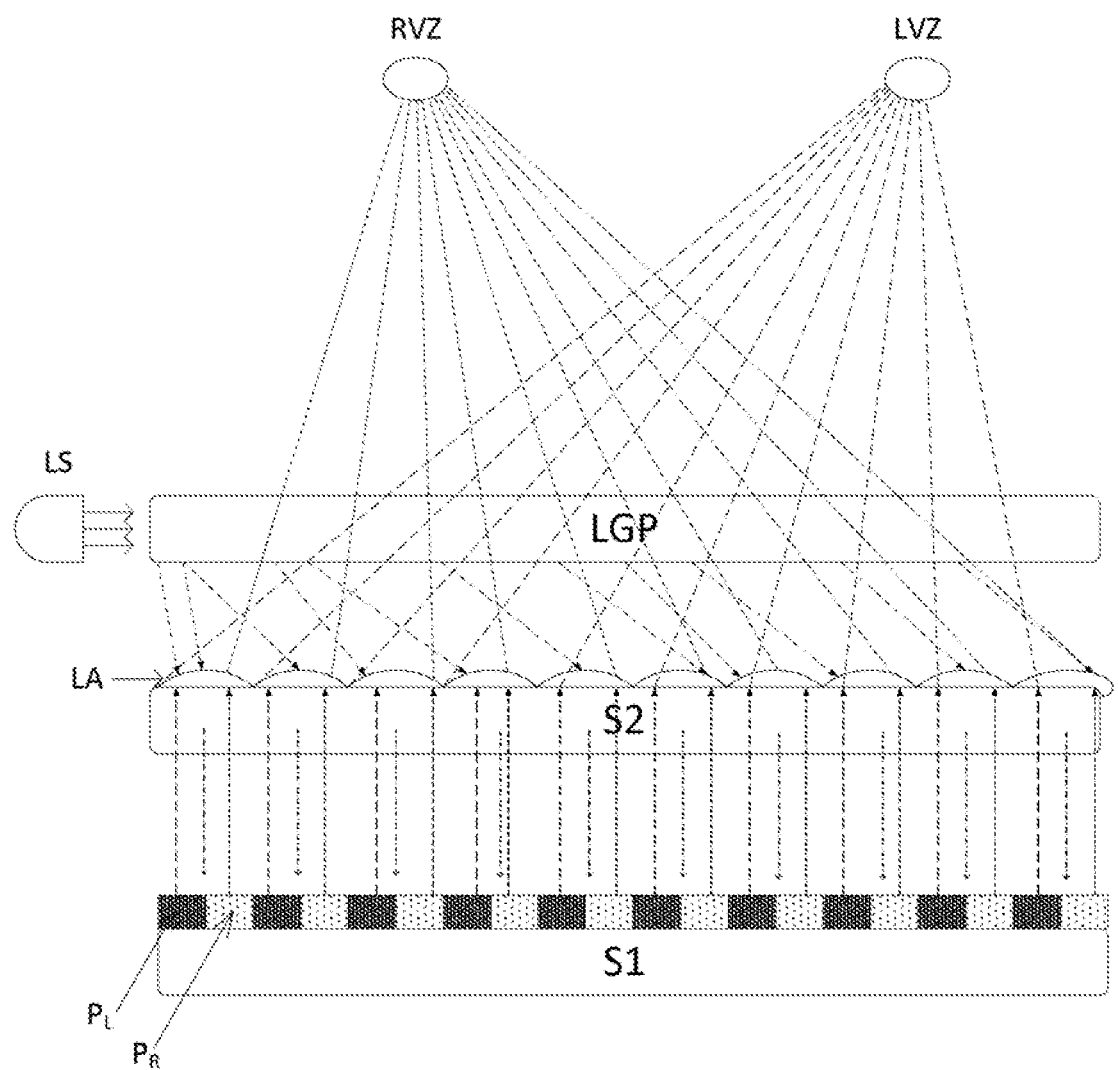
FIG. 3 is a diagram illustrating the structure of a display panel in some embodiments.

FIG. 3 is a diagram illustrating the structure of a display panel in some embodiments. Referring to FIG. 3, the display panel in the embodiment includes a light source LS, a light guide plate LGP in which light emitted from the light source LS is totally reflected until emits out of the light guide plate LGP at an extraction angle, a first display substrate S1 (e.g., a thin film transistor substrate) including a plurality pairs of adjacent first pixel $P_L$ and second pixel $P_R$, a second display substrate S2 (e.g., a color filter substrate) facing the first display substrate S1, and a lens array layer LA for directing light reflected by the first display substrate into at least a first view zone and a second view zone, e.g., a left eye view zone LVZ and a right eye view zone RVZ. Optionally, the lens array layer LA is configured so that each lens corresponds to at least a pair of pixels $P_L$ and $P_R$. In the example shown in FIG. 3, each lens corresponds to a pair of pixels $P_L$ and $P_R$. Optionally, each lens corresponds to a plurality pairs of pixels $P_L$ and $P_R$. Optionally, substantially all light reflected by the first pixel $P_L$ is directed into the first view zone, e.g., the left eye view zone LVZ. Optionally, substantially all light reflected by the second pixel $P_R$ is directed into the second view zone, e.g., the right eye view zone RVZ. Optionally, a majority of light reflected by the first pixel $P_L$ is directed into the first view zone, e.g., the left eye view zone LVZ. Optionally, a majority of light reflected by the second pixel $P_R$ is directed into the second view zone, e.g., the right eye view zone RVZ. The light guide plate LGP has a light incident surface and a light emitting surface, the light emitting surface proximal to the second display substrate for providing the incident light to the first display substrate (the reflective substrate).

In some embodiments, the display panel includes a first display substrate S1 (e.g., a thin film transistor substrate), a second display substrate S2 (e.g., a color filter substrate) facing the first display substrate S1, a light guide plate LGP on a side of the second display substrate S2 distal to the first display substrate S1, and a lens array layer LA on a side of the second display substrate S2 proximal to the light guide plate LGP.

In some embodiments, the display panel is a reflective liquid crystal display panel. In some embodiments, the display panel includes a thin film transistor substrate having a reflective electrode layer on a base substrate, a liquid crystal layer, a counter substrate on a side of the liquid crystal layer distal to the thin film transistor substrate, a light guide plate on a side of the counter substrate distal to the thin film transistor substrate, and a lens array layer on a side of the thin film transistor substrate distal to the base substrate. Optionally, the counter substrate is a color filter substrate. Optionally, the lens array layer is on a side of the counter substrate distal to the thin film transistor substrate. Optionally, the display panel further includes a polarizer layer on a side of the counter substrate. Optionally, the lens array layer is on a side of the polarizer layer proximal to the counter substrate. Optionally, the lens array layer is on a side of the polarizer layer distal to the counter substrate. Optionally, the display panel further includes a cover glass on a side of the polarizer layer distal to the counter substrate. Optionally, the lens array layer is on a side of the cover glass proximal to the polarizer layer (or proximal to the counter substrate). Optionally, the lens array layer is on a side of the cover glass distal to the polarizer layer (or proximal to the counter substrate).

Figure 4:
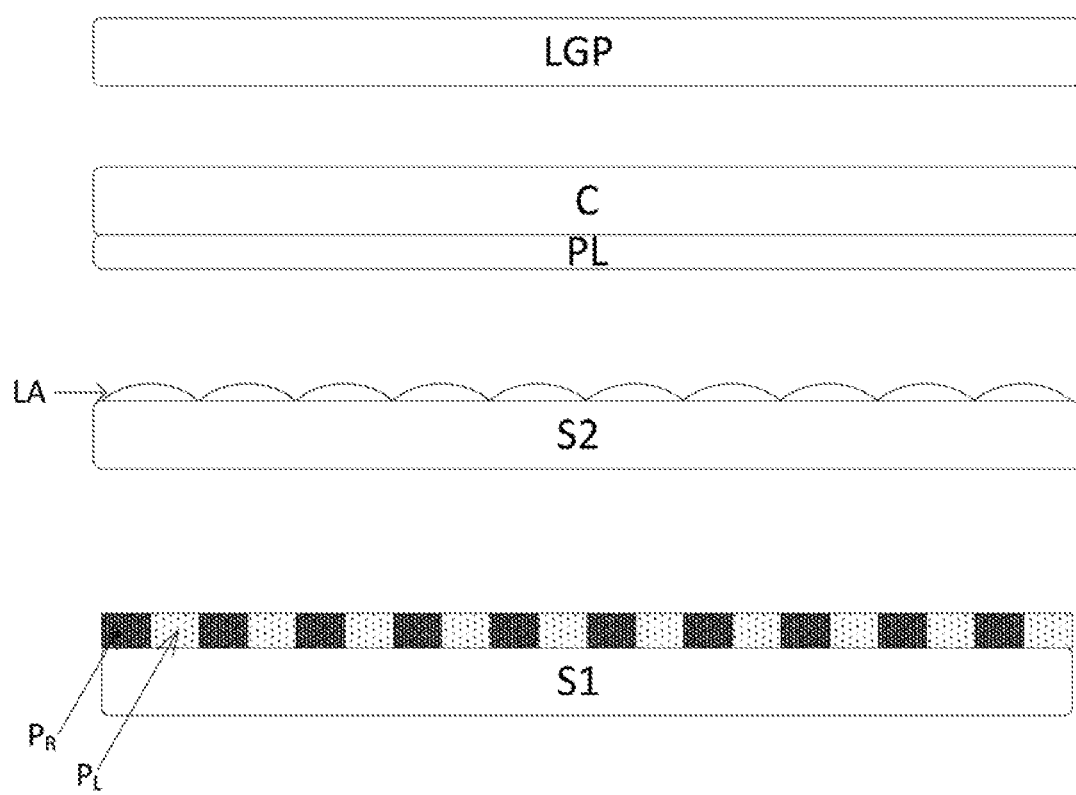
FIG. 4 is a diagram illustrating the structure of a display panel in some embodiments.

FIG. 4 is a diagram illustrating the structure of a display panel in some embodiments. Referring to FIG. 4, the display panel in the embodiment includes a first display substrate S1 (e.g., a thin film transistor substrate having a reflective electrode layer on a base substrate), a second display substrate S2 (e.g., a color filter substrate) facing the first display substrate S1, a lens array layer LA on a side of the second display substrate S2 distal to the first display substrate S1, a polarizer layer PL on a side of the lens array layer LA distal to the second display substrate S2, and a light guide plate LGP on a side of the polarizer layer PL distal to the lens array layer LA. Optionally, the display panel further includes a cover glass C on a side of the polarizer layer PL distal to the lens array layer LA, and on a side of the light guide plate LGP proximal to the polarizer layer PL, i.e., between the polarizer layer PL and the light guide plate LGP. The cover glass C is not required when the second display substrate S2 is a color filter substrate.

Focal length of a lens of the lens array layer may be determined based on a typical reading distance and a typical pixel size. For example, the focal length may be determined based on Equation (1):

$$f = \frac{(L*P)}{(2*IPD)};\quad(1)$$

wherein IPD is a distance between a first view zone (e.g., a left eye view zone) and a second view zone (e.g., a right eye view zone); P is a pixel size; and L is a reading distance, e.g., a normal distance between a lens array layer and a view point (e.g., the first view zone and the second view zone).

Figure 5:
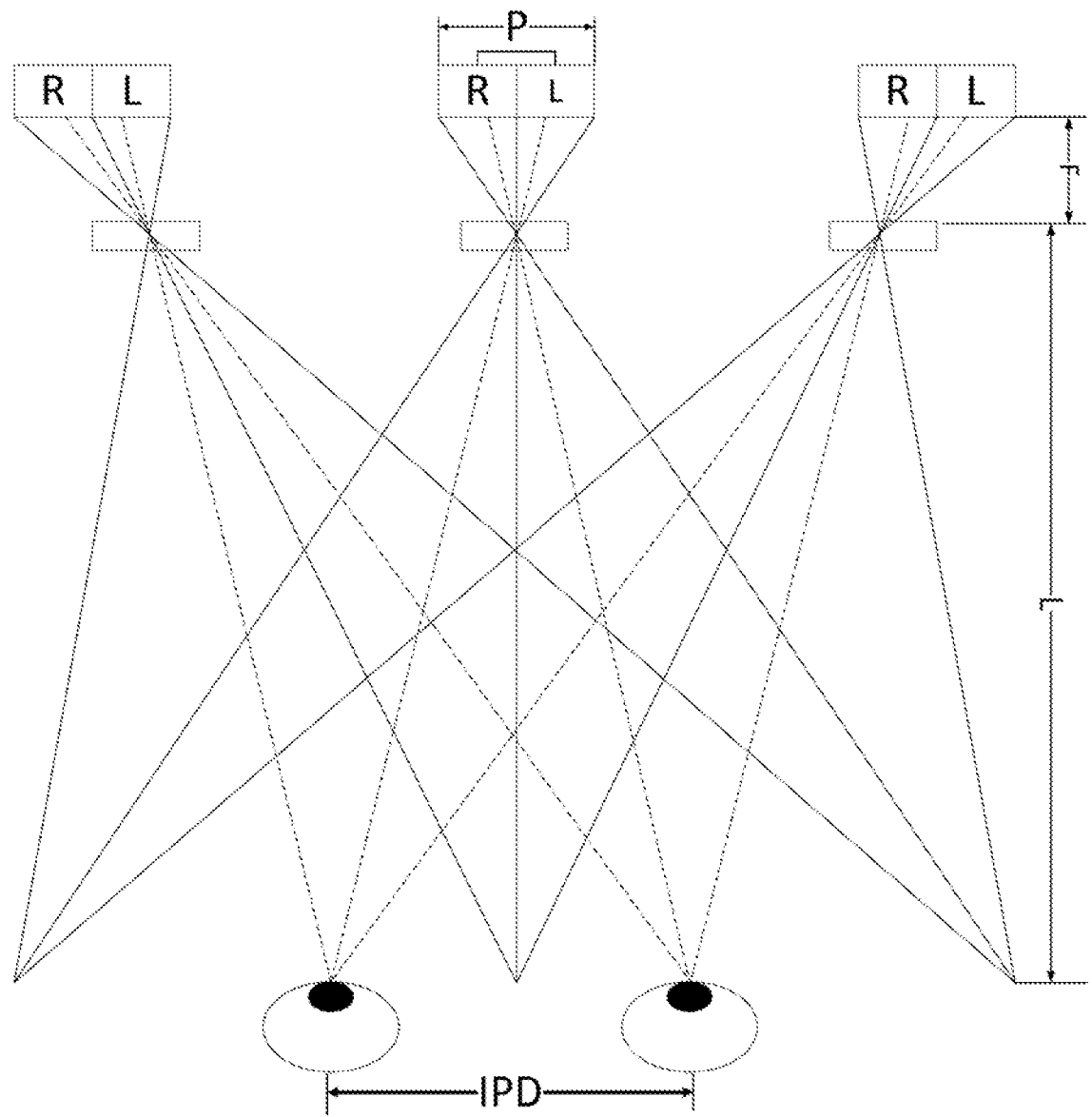
FIG. 5 illustrates the relationship between a focal length of a lens and a reading distance in some embodiments.

FIG. 5 illustrates the relationship between a focal length of a lens and a reading distance in some embodiments. Referring to FIG. 5, the first view zone is a left eye of a user and the second view zone is a right eye of the user. The normal distance between the lens array layer and the first and second view zones is defined as L. The pixel size P is defined as a sum of widths of a pair of adjacent first pixel L and second pixel R.

In one example, IPD is approximately 50 mm, the average distance between a left eye and a right eye; the pixel size is approximately 100 m; and the reading distance is approximately 200 mm. A focal length for achieving the 200 mm reading distance can be determined to be approximately 1 mm.

Figure 6:
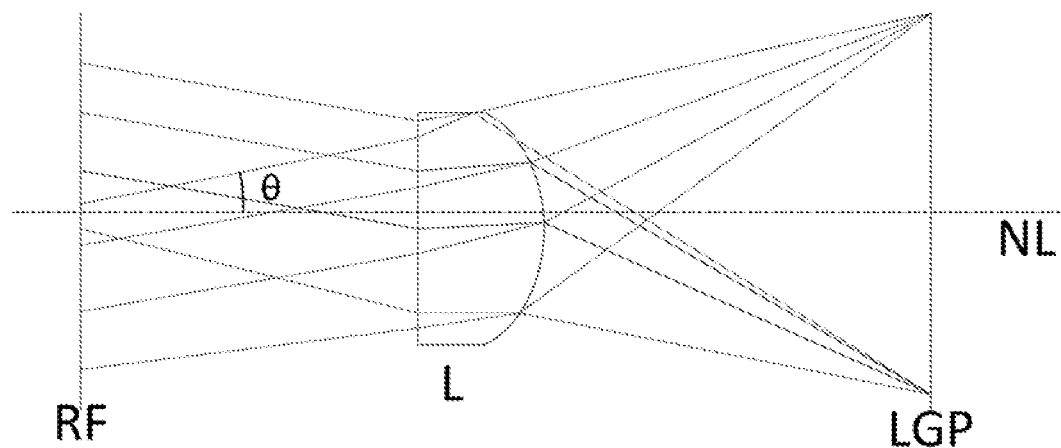
FIG. 6 illustrates the principle of operation of a lens for improving reflectivity of a reflective display panel in some embodiments.

As discussed above, one of the disadvantages of the conventional reflective display panel is that light emitted from the front light guide plate has a relatively large extraction angle, resulting in a low reflectivity. By having a lens array layer in the present reflective display panel, the reflectivity of the display panel may be improved. FIG. 6 illustrates the principle of operation of a lens for improving reflectivity of a reflective display panel in some embodiments. Referring to FIG. 6, the light emitted from the light guide plate LGP has a relatively large extraction angle. The light is then refracted by a lens L of the lens array layer, and is directed towards a reflective film RF (e.g., a reflective electrode layer of the display panel). As shown in FIG. 6, an angle θ between the refracted light and a normal line NL to a surface of the reflective film RF is smaller than that for the light emitted out of the light guide plate LGP. The refracted light becomes the incident light to the reflective film RF and is then reflected by the reflective film RF for image display. Accordingly, an angle between light reflected by the reflective film RF and the normal line NL to the surface of the reflective film RF is also reduced, as compared to that in a conventional reflective display panel without a lens array layer. As such, a majority of the light reflected by the reflective film RF is directed to a display area of the display panel, greatly enhancing light utilization of the display panel.

Table 1 illustrates the correlation between the reflectivity of the display panel and the angle θ between light incident to the reflective film and the normal line to the surface of the reflective film in some embodiments. As show in Table 1, an average reflectivity of the display panel improves from 76.81% at an angle θ of 30 degrees to 171.27% at an angle θ of 10 degrees.

TABLE 1

Correlation between the reflectivity of the display panel and the angle θ between light incident to the reflective film and the normal line to the surface of the reflective film in some embodiments.

| Reflectivity | θ = 10 degrees | θ = 20 degrees | θ = 30 degrees |
| --- | --- | --- | --- |
| 1 | 174.91% | 72.05% | 65.08% |
| 2 | 181.68% | 110.14% | 78.82% |
| 3 | 160.81% | 113.34% | 81.85% |
| 4 | 167.69% | 114.11% | 81.48% |
| Average | 171.27% | 102.41% | 76.81% |

In some embodiments, the display panel is a reflective liquid crystal display panel. When ambient light intensity is high, the reflective liquid crystal display panels use ambient as light source for image display. When ambient light intensity is low, the front light guide is turned on as light source for image display. Referring to FIG. 4, the display panel in the embodiment includes a polarizer layer PL between a cover glass C and a lens array layer LA. An incident light (e.g., ambient light or light emitted from the light guide plate LGP) transmits through the polarizer layer PL, and irradiates on the lens array layer LA. As discussed in connection with FIG. 6, the lens array layer LA focuses the incident light, refracting the incident light so that a direction of the incident light changes before it irradiates on the reflective film RF (e.g., a reflective electrode layer on the first display substrate S1). Due to the presence of the lens array layer LA, the angle θ between light incident to the reflective film RF and the normal line to the surface of the reflective film now becomes smaller. The reflective film RF reflects the refracted light for image display. A majority of the reflected light is directed to a display area. As such, light utilization efficiency of the display panel may be greatly enhanced.

Referring to FIG. 4, the first display substrate S1 includes a plurality pairs of adjacent first pixel $P_L$ and second pixel $P_R$. Optionally, substantially all light reflected by the first pixel $P_L$ is directed into the first view zone, e.g., a left eye of a user. Optionally, substantially all light reflected by the second pixel $P_R$ is directed into the second view zone, e.g., a right eye of a user. Optionally, a majority of light reflected by the first pixel $P_L$ is directed into the first view zone, e.g., a left eye of a user. Optionally, a majority of light reflected by the second pixel $P_R$ is directed into the second view zone, e.g., a right eye of a user. By having this design, a left eye image and a right eye image are separated, achieving three-dimensional image display.

Figure 7:
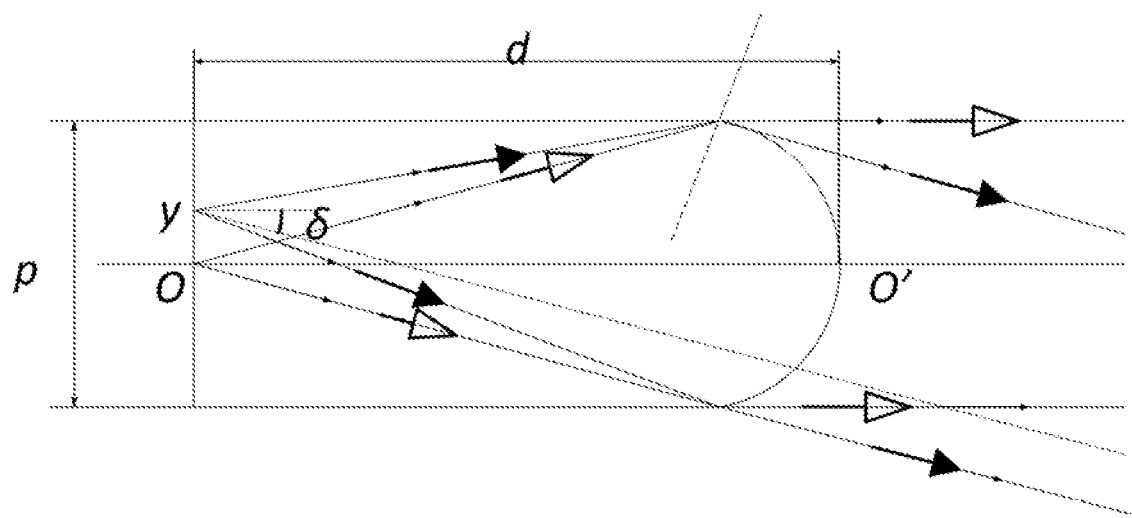
FIG. 7 illustrates the principle of operation of beam splitting effect of a cylindrical lens in some embodiments.

FIG. 7 illustrates the principle of operation of beam splitting effect of a cylindrical lens in some embodiments. Referring to FIG. 7, one or more pixel (e.g., a pair of adjacent first pixel $P_L$ and second pixel $P_R$) is situated on a back focal plane of the cylindrical lens. A bundle of light beams from a point O on the back focal plane are refracted by the cylindrical lens. Because the point O is on the back focal plane of the cylindrical lens, the bundle of light beams is focused by the cylindrical lens and emit out of the cylindrical lens as a first bundle of parallel light beams. As shown in FIG. 7, the direction of the first bundle of light beams is substantially parallel to the optical axis of the cylindrical lens (along the O-O' line). A bundle of light beams from a point y (which is situated on the back focal plane above the point O) are refracted and focused by the cylindrical lens, and emit out of the cylindrical lens as a second bundle of parallel light beams. As shown in FIG. 7, the second bundle of parallel light beams are directed to a different view zone from that for the first bundle of parallel light beams. As compared to the first bundle of parallel light beams, the second bundle of parallel light beams are directed along a direction inclined downward from the optical axis of the cylindrical lens. Similarly, a bundle of light beams from a point on the back focal plane below the point O will be refracted and focused by the cylindrical lens, and emit out of the cylindrical lens as a third bundle of parallel light beams. The third bundle of parallel light beams will be directed along a direction inclined upward from the optical axis of the cylindrical lens. Based on the beam splitting effect of a cylindrical lens, a three-dimensional view image display may be achieved.

Figure 8:
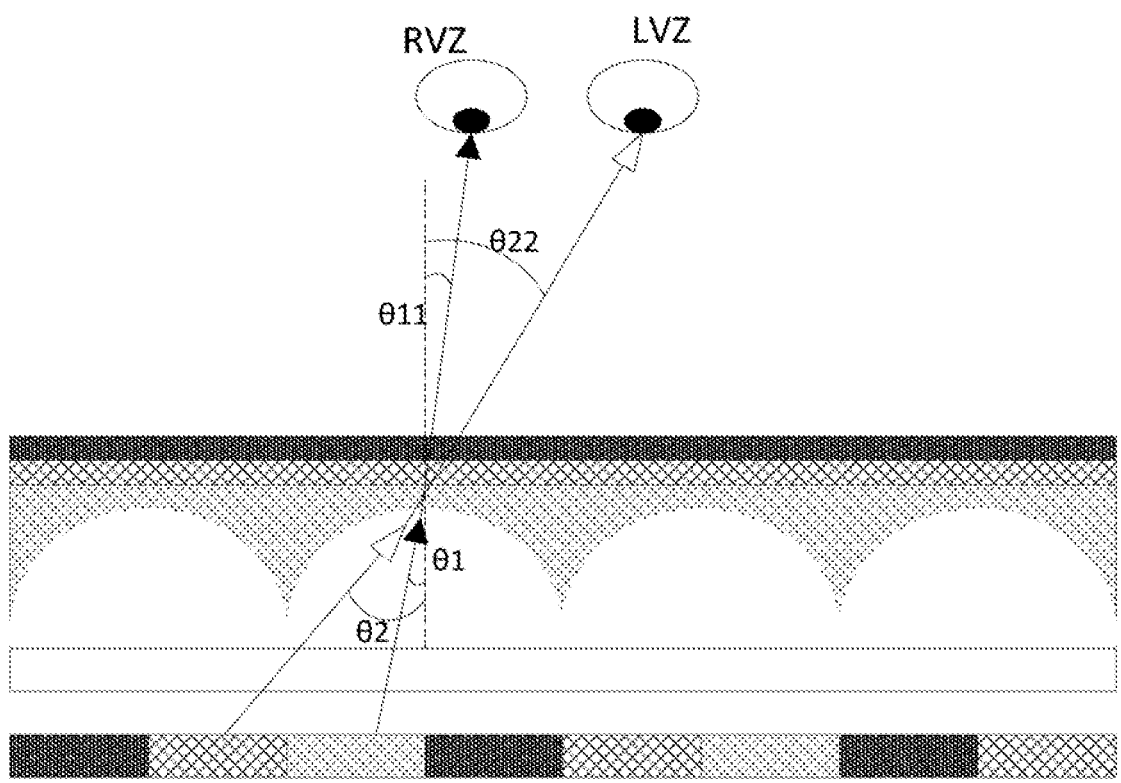
FIG. 8 illustrates a light path in a reflective display panel in some embodiments.

FIG. 8 illustrates a light path in a reflective display panel in some embodiments. FIG. 8 illustrates two light beams reflected by a reflective electrode layer on the first display substrate. The first light beam is reflected by the first pixel $P_L$, and transmits into the cylindrical lens at an angle θ1 (between the first light beam and a normal line to a surface of the reflective electrode layer). The first light beam is then refracted at the interface between the cylindrical lens and a medium on top of the cylindrical lens, the refracted first light beam is directed towards a first view zone (e.g., a right eye view zone RVZ). The angle between the refracted first light beam and the normal line to a surface of the reflective electrode layer is θ11. The second light beam is reflected by the second pixel $P_R$, and transmits into the cylindrical lens at an angle θ2 (between the second light beam and a normal line to a surface of the reflective electrode layer). The second light beam is then refracted at the interface between the cylindrical lens and a medium on top of the cylindrical lens, the refracted second light beam is directed towards a second view zone (e.g., a left eye view zone LVZ). The angle between the refracted second light beam and the normal line to a surface of the reflective electrode layer is θ22. The refractive index of the cylindrical lens is n1, and the refractive index of the medium on top of the cylindrical lens is n2. The angle θ11 may be determined by sin θ1×n1=sin θ11×n2, the angle θ22 may be determined by sin θ2×n1=sin θ22×n2. Any appropriate optical transparent material may be used for making the cylindrical lens and the medium on top of the cylindrical lens. Examples includes, but are not limited to, resin, glass, quartz, etc. By selecting appropriate transparent material for the cylindrical lens and the medium on top of the cylindrical lens, respectively, the image may be separated into difference view zones.

Figure 9:
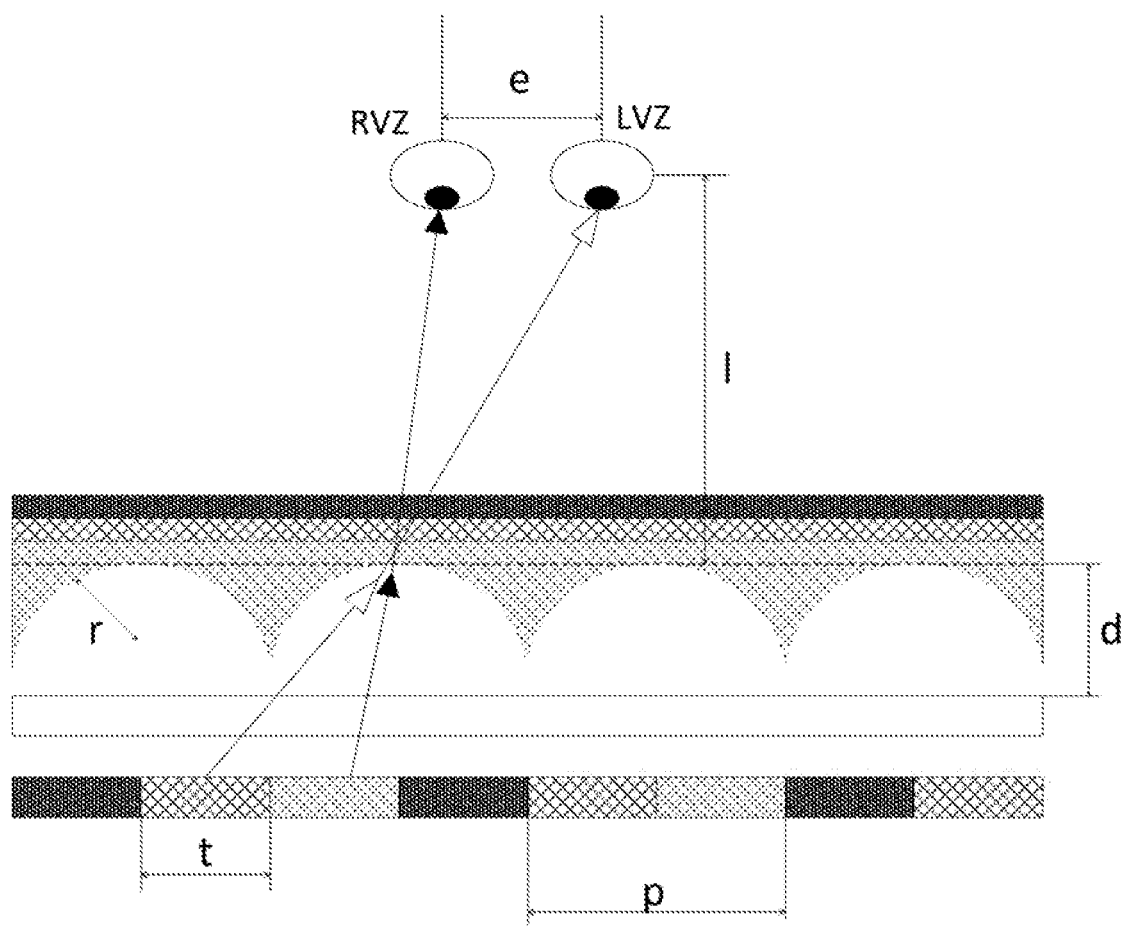
FIG. 9 illustrates various parameters of a reflective display panel in some embodiments.

FIG. 9 illustrates various parameters of a reflective display panel in some embodiments. Referring to FIG. 9, the pixel has a pixel width t, the cylindrical lens has a radius of curvature r, a distance between a first view zone and a second view zone is defined as e, a reading distance between the first and second view zone and the cylindrical lens is defined as l. The radius of curvature r may be determined according to Equation (2):

$$r = \frac{t*l*(n1-1)}{e}. \qquad (2)$$

When any disparity image is observed by an eye of the user, a point observed by the best view point through the cylindrical lens should belong to the disparity image overlaid by the cylindrical lens. When there are m disparity images, the lens pitch p may be determined according to Equation (3):

$$\frac{m*e*t}{e+t} - \frac{(m*e*t^2)/w}{e+t} < p < \frac{m*e*t}{e+t} + \frac{(m*e*t^2)/w}{e+t}. \qquad (3)$$

Thus, an optimal value for p would be $$\frac{m*e*t}{e+t},$$

and may be varied in the range of $$\frac{m*e*t}{e+t} - \frac{(m*e*t^2)/w}{e+t} \text{ to } \frac{m*e*t}{e+t} + \frac{(m*e*t^2)/w}{e+t}.$$

The thickness of the lens may be determined by Equation (4):

$$d = \frac{n1*r}{(n1-1)}. \qquad (4)$$

Accordingly, the cylindrical lens may be designed based on these calculated parameters, including the radius of curvature r, the lens pitch p, and the lens thickness d.

Figure 10:
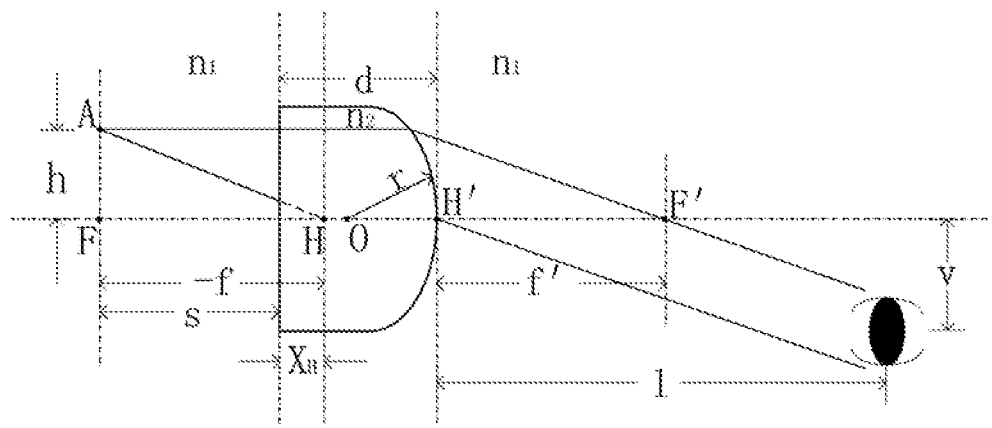
FIG. 10 illustrates a light path in a cylindrical lens in some embodiments.

FIG. 10 illustrates a light path in a cylindrical lens in some embodiments. Referring to FIG. 10, F is the object focal point of the cylindrical lens and F' is the image focal point of the cylindrical lens. H is the object principal point of the cylindrical lens and H' is the image principal point of the cylindrical lens, n1 is the refractive index of the of the cylindrical lens, and n2 is the refractive index of the medium adjacent to the cylindrical lens. The focal length of the cylindrical lens may be determined according to Equation (5):

$$f' = -f = \frac{n_2}{n_2 - n_1}r. \qquad (5)$$

The normal distance $X_H$ between the back plane of the cylindrical lens and the object principal point H may be determined according to Equation (6):

$$x_n = \frac{n_1}{n_2}d; \qquad (6)$$

wherein d is the lens thickness, and r is the radius of curvature.

The transmission direction of the light beam remains the same before and after it passes the object principal point H, i.e., the angles between the transmission directions and the optical axis of the cylindrical lens are the same. Thus, $$\frac{h}{f'} = \frac{v}{l}, h = \frac{f'v}{l}. \qquad (7)$$

Figure 11:
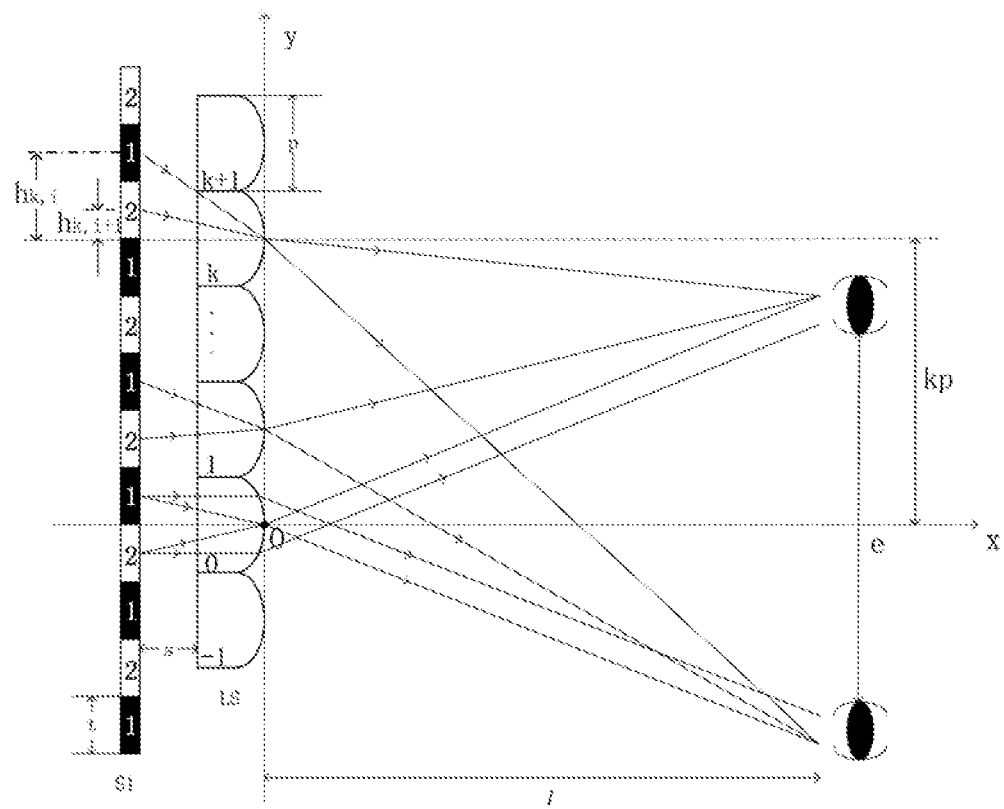
FIG. 11 illustrates the beam splitting effect of a lenticular sheet in a three-dimensional image display panel.

FIG. 11 illustrates the beam splitting effect of a lenticular sheet in a three-dimensional image display panel. Referring to FIG. 11, the three-dimensional image display panel includes a first substrate S1 having a plurality pairs of first pixels 1 and second pixels 2, and a lenticular sheet LS. The first substrate S1 is disposed on the object focal plane of the lenticular sheet LS. FIG. 11 shows a coordinate system, in which an apex O of a cylindrical lens 0 is used as the origin of the coordinate system, an optical axis of the cylindrical lens 0 is used as the X-axis, and the Y-axis is a line parallel to the first substrate S1 connecting apex points of a plurality of cylindrical lenses. A plurality of cylindrical lenses 1, 2, . . . , k, k+1, . . . are arranged along the positive direction of the Y-axis. A plurality of cylindrical lenses −1, −2, . . . , −k, −(k+1), . . . are arranged along the negative direction of the Y-axis.

Typically, a viewer would place the display panel around the center of the view field, i.e., view points of disparity images symmetrically distribute around the X-axis. For example, if the three-dimensional image display panel has a number of m disparity images, the best view point for the i-th disparity image may be determined as (l, [i−(m+1)/2]e), wherein i is an integer between 1 and m, l is a distance of distinct vision, e is a distance between adjacent disparity points. Optionally, when m=2, e is an interpupillary distance of human eyes.

In some embodiments, m=2. When the first disparity image is observed (i=1), its corresponding view point coordinate is (l, −e/2), and when the second disparity image is observed (i=2), its corresponding view point coordinate is (l, e/2). The distance between a point observed by the view point through the k-th cylindrical lens and the optical axis of the k-th cylindrical lens may be determined by Equation (7) above. For example, the distance ht between the point observed by the view point in the i-th disparity image through the k-th cylindrical lens and the optical axis of the k-th cylindrical lens is:

$$h_{k,i} = f' \frac{kp - [i - (m+1)/2]e}{l}; \tag{8}$$

and the distance $h_{k,i+1}$ between the point observed by the view point in the (i+1)-th disparity image through the k-th cylindrical lens and the optical axis of the k-th cylindrical lens is:

$$h_{k,i+1} = f' \frac{kp - [(i+1) - (m+1)/2]e}{l}. \tag{9}$$

Thus, the pixel width t may be determined as follows:

$$t = h_{k,i} - h_{k,i+1} \tag{10}.$$

Based on Equations (5), (8), (9), and (10), the radius of curvature r may be determined according to the following Equation:

$$r = \frac{tl(n_2 - n_1)}{n_1 e}. \tag{11}$$

Further, an object point of the i-th disparity image observed through the m-th cylindrical lens should be within the view field of the i-th disparity image, i.e., $$mkt + \left(\frac{m}{2} - i\right)t < kp + h_{k,i} < mkt + \left(\frac{m}{2} - i + 1\right)t. \tag{12}$$

By substituting various parameters in Equations (12) with values derived from Equations (5), (8), and (11), the lens pitch p may be determined according to the following Equation:

$$\frac{met}{e+t} - \frac{et}{2k(e+t)} < p < \frac{met}{e+t} + \frac{et}{2k(e+t)}. \tag{13}$$

The relationship between k and a width of the display panel satisfies the following Equation:

$$w = 2kmt, \quad 2k = \frac{w}{mt}. \tag{14}$$

By combining Equations (13) and (14), the lens pitch p may be expressed as follows:

$$\frac{met}{e+t} - \frac{met^2/w}{e+t} < p < \frac{met}{e+t} + \frac{met^2/w}{e+t}. \tag{15}$$

Thus, an optimal value for p would be:

$$p = \frac{met}{e+t}; \tag{16}$$

and may be varied in a range of $$\frac{met}{e+t} - \frac{et}{2k(e+t)} \text{ to } \frac{met}{e+t} + \frac{et}{2k(e+t)}.$$

The number of view zones in FIG. 11 is 2, i.e., m=2, the optimal value for the lens pitch p is $$p = \frac{2et}{e+t}.$$

The focal length f' of the cylindrical lens may be determined as follows:

$$f' = s + x_H \tag{17};$$

wherein s is the normal distance between the cylindrical lens and the first substrate S1 (see, also, FIG. 10).

By combining Equations (5), (6), and (17), the lens thickness d may be determined according to the following Equation:

$$d = \frac{n_2 r}{n_2 - n_1} - \frac{n_2 s}{n_1}. \tag{18}$$

Accordingly, the radius of curvature r, the lens pitch p, and the lens thickness d of the cylindrical lens may be selected for various embodiments.

Based on the above, the present disclosure in one aspect provides a three-dimensional display panel having a first display substrate including a plurality groups of M pixels, the first display substrate being a reflective display substrate; a second display substrate facing the first display substrate, the second display substrate being a transparent display substrate; a liquid crystal layer sandwiched between the first display substrate and the second display substrate (e.g., on a side of the second display substrate proximal to the first display substrate); and a lens array layer including a plurality of lenses for directing light reflected by the first display substrate into N view zones, e.g., directing light reflected by each of the M pixels into of the N view zones. Optionally, the first display substrate includes a reflective electrode layer on a base substrate.

Optionally, each of the M pixels includes a single subpixel. Optionally, each of the M pixels includes a single subpixel of a same color. Optionally, each of the M pixels includes a single subpixel, and M pixels includes M subpixels of different colors. For examples, the first display substrate may include a plurality groups of three pixels, each of the three pixels includes a single subpixel, and three pixels includes three subpixels of different colors, e.g., a red subpixel, a green subpixel, and a blue subpixel.

Optionally, each of the M pixels includes a plurality of subpixels. Optionally, each of the M pixels includes a plurality of subpixels of different colors, e.g., a red subpixel, a green subpixel, and a blue subpixel.

Optionally, the lens array layer is configured to direct light reflected by the first display substrate into at least M view zones. Optionally, the lens array layer is configured to direct light reflected by the first display substrate into at least a first view zone and a second view zone.

Optionally, M is a positive integer ≥2. Optionally, N is a positive integer ≥2. Optionally, M=N, i.e., the lens array layer is configured to direct light reflected by each of the M pixels into one of the N view zones, N=M. Optionally, light reflected by each of the M pixels is directed into a corresponding view zone, e.g., in a one-to-one relationship.

Optionally, M=N=2, i.e., the first display substrate includes a plurality pairs of adjacent first pixel and second pixel, and the lens array layer is configured to direct light reflected by a first pixel into a first view zone and direct light reflected by a second pixel into a second view zone.

In some embodiments, each lens of the plurality of lenses corresponds to L groups of M pixels, L≥1; e.g., each lens of the plurality of lenses is configured to direct light reflected by a m-th pixel in each of L groups of M pixels ($1 \leq m \leq M$) into a n-th view zone ($1 \leq n \leq N$). Optionally, M=N, each lens of the plurality of lenses corresponds to L groups of M pixels, $L \geq 1$; e.g., each lens of the plurality of lenses is configured to direct light reflected by a m-th pixel in each of L groups of M pixels ($1 \leq m \leq M$) into a m-th view zone ($1 \leq m \leq M$). Optionally, M=N=2.

Optionally, L=1, each lens of the plurality of lenses corresponds to a group of M pixels; e.g., each lens of the plurality of lenses is configured to direct light reflected by a m-th pixel in each group of M pixels ($1 \leq m \leq M$) into a n-th view zone ($1 \leq n \leq N$). Optionally, M=N, each lens of the plurality of lenses corresponds to a group of M pixels; e.g., each lens of the plurality of lenses is configured to direct light reflected by a m-th pixel in each group of M pixels ($1 \leq m \leq M$) into a m-th view zone ($1 \leq m \leq M$). Optionally, M=N=2.

Optionally, L=2, each lens of the plurality of lenses corresponds a first group of M pixels and a second group of M pixels, e.g., each lens of the plurality of lenses is configured to direct light reflected by a m-th pixel in the first group of M pixels and the second group of M pixels ($1 \leq m \leq M$) into a n-th view zone ($1 \leq n \leq N$). Optionally, M=N, each lens of the plurality of lenses corresponds to a first group of M pixels and a second group of M pixels; e.g., each lens of the plurality of lenses is configured to direct light reflected by a m-th pixel in the first group of M pixels and the second group of M pixels ($1 \leq m \leq M$) into a m-th view zone ($1 \leq m \leq M$). Optionally, M=N=2.

Optionally, L=3, each lens of the plurality of lenses corresponds a first group of M pixels, a second group of M pixels, and a third group of M pixels, e.g., each lens of the plurality of lenses is configured to direct light reflected by a m-th pixel in the first, second, and third groups of M pixels ($1 \leq m \leq M$), respectively, into a n-th view zone ($1 \leq n \leq N$). Optionally, M=N, each lens of the plurality of lenses corresponds to a first group of M pixels, a second group of M pixels, and a third group of M pixels; e.g., each lens of the plurality of lenses is configured to direct light reflected by a m-th pixel in the first, second, and third groups of M pixels ($1 \leq m \leq M$), respectively, into a m-th view zone ($1 \leq m \leq M$). Optionally, M=N=2.

Optionally, each lens of the plurality of lenses corresponds to at least a pair of first pixel and second pixel, e.g., each lens of the plurality of lenses is configured to direct light reflected by at least a pair of first pixel and second pixel into at least a first and a second view zones, respectively. Optionally, each lens of the plurality of lenses corresponds to a pair of first pixel and second pixel, e.g., each lens of the plurality of lenses is configured to direct light reflected by the first pixel into a first view zone, and direct light reflected by the second pixel into a second view zone. Optionally, each lens of the plurality of lenses corresponds to a plurality pairs of first pixel and second pixel, e.g., each lens of the plurality of lenses is configured to direct light reflected by the first pixels in the plurality pairs into a first view zone, and direct light reflected by the second pixels in the plurality pairs into a second view zone.

In some embodiments, the three-dimensional display panel further includes a light guide plate for providing incident light to the first display substrate. Optionally, the three-dimensional display panel further includes a light source. Optionally, light emitted from the light source is totally reflected in the light guide plate until it emits out of the light guide plate at an extraction angle.

Figure 12:
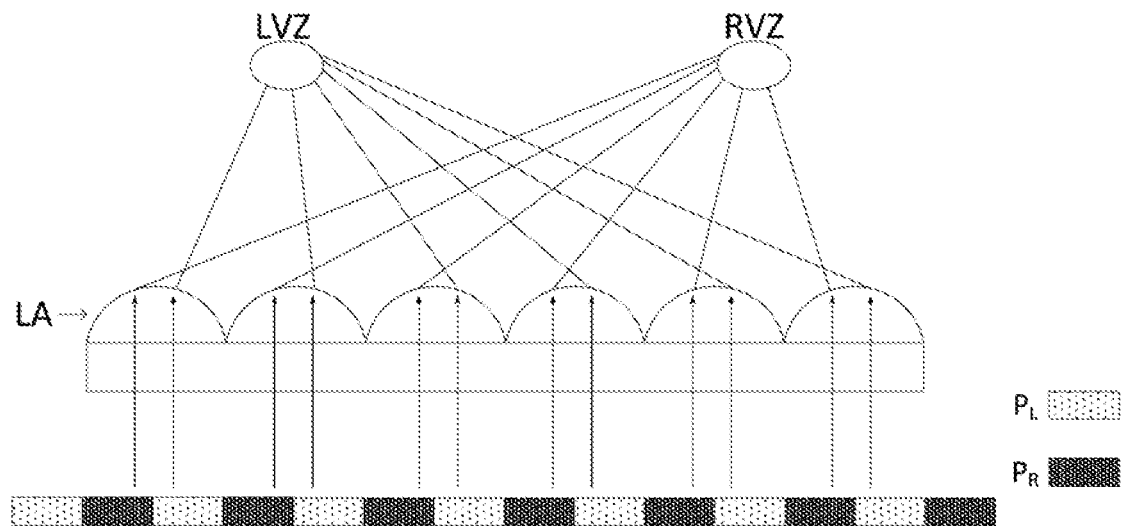
FIG. 12 is a diagram illustrating the structure of a display panel in some embodiments.

FIG. 12 is a diagram illustrating the structure of a display panel in some embodiments. Referring to FIG. 12, the three-dimensional display panel in the embodiment includes a first display substrate including a plurality pairs of adjacent first pixel $P_L$ and second pixel $P_R$, the first display substrate being a reflective display substrate; a second display substrate facing the first display substrate, the second display substrate being a transparent display substrate; and a lens array layer LA including a plurality of lenses for directing light reflected by the first display substrate into a first view zone LVZ and a second view zone RVZ. Each lens of the plurality of lenses corresponds to a pair of first pixel $P_L$ and second pixel $P_R$, e.g., each lens of the plurality of lenses is configured to direct light reflected by a pair of first pixel $P_L$ and second pixel $P_R$ into the first view zone LVZ and the second view zone RVZ.

Various appropriate materials and fabricating methods may be used for forming the lens array layer. For example, the lens array layer may be made of a transparent organic or inorganic material such as glass, quartz, or resin. The lens array layer may be formed by, e.g., exposing and developing a photoresist material, laser writing, plasma writing, three-dimensional printing, etc. Examples of lenses include, but are not limited to, cylindrical lenses, semi-cylindrical lenses, biconvex lenses, biconcave lenses, planoconcave lenses, planoconvex lenses, meniscus lenses, concave-convex lenses, etc.

Figure 13:
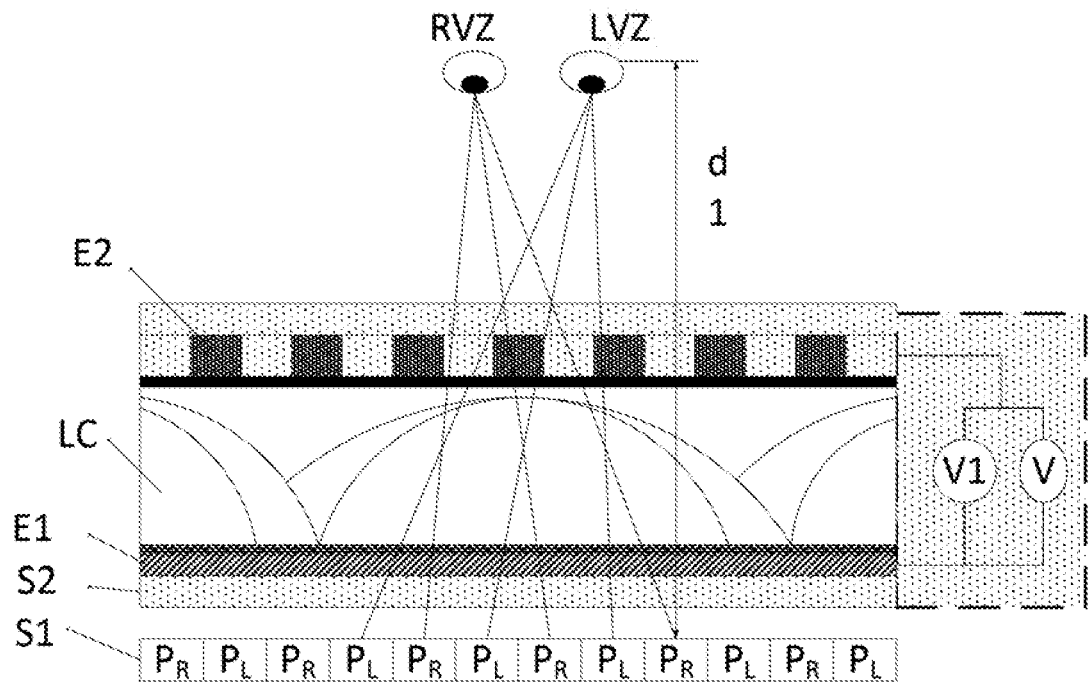
FIG. 13 is a diagram illustrating the structure of a display panel in some embodiments.

FIG. 13 is a diagram illustrating the structure of a display panel in some embodiments. Referring to FIG. 13, the lens array layer in the embodiment is an electrical driven liquid crystal lens array layer LC. The electrical driven liquid crystal lens array layer LC is sandwiched between and driven by a first electrode layer E1 and a second electrode layer E2 connected to a circuit. The electrical driven liquid crystal lens array layer is driven so that it directs light reflected by a first pixel $P_L$ into a first view zone LVZ, and directs light reflected by a second pixel $P_R$ into a second view zone RVZ. The electrical driven liquid crystal lens array layer may include a plurality of liquid crystal lenses, as shown in FIG. 13. Each liquid crystal lens corresponds to several groups of first pixel $P_L$ and second pixel $P_R$, e.g., three groups of first pixel $P_L$ and second pixel $P_R$. Each liquid crystal lens is configured to direct light reflected by each first pixel $P_L$ in the corresponding several groups (e.g., corresponding three groups) into the first view zone LVZ, and direct light reflected by each second pixel $P_R$ in the corresponding several groups (e.g., corresponding three groups) into the second view zone RVZ. Optionally, each lens corresponds to a single group of first pixel $P_L$ and second pixel $P_R$. Optionally, the three-dimensional display panel in the embodiment further includes a first display substrate S1 having a plurality pairs of adjacent first pixel $P_L$ and second pixel $P_R$, the first display substrate S1 being a reflective display substrate; a second display substrate S2 facing the first display substrate S1, the second display substrate S2 being a transparent display substrate; and a liquid crystal layer sandwiched between the first display substrate S1 and the second display substrate S2.

Figure 14:
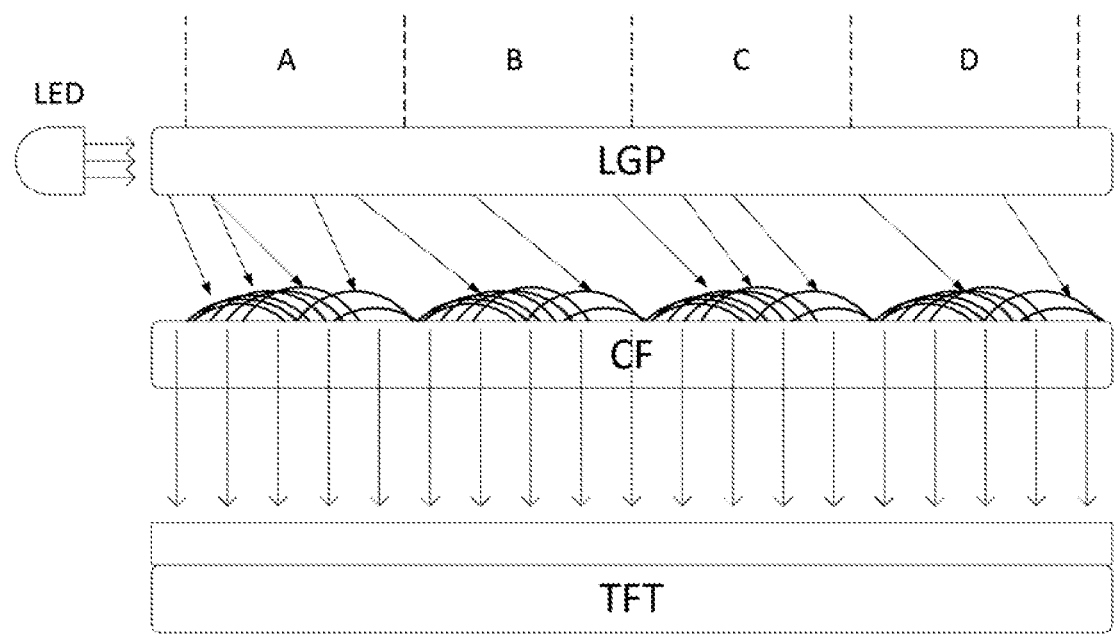
FIG. 14 is a diagram illustrating the structure of a display panel in some embodiments.

FIG. 14 is a diagram illustrating the structure of a display panel in some embodiments. Referring to FIG. 14, the light guide plate in the embodiment includes a plurality of light extraction regions, e.g., regions A, B, C, and D. The plurality of light extraction regions have different extraction angles. Moreover, the lens array layer may include a plurality of lenses having different radii of curvature. By having this design, each light extraction region may correspond to one or more lens having a radius of curvature suitable for refracting the light from the light extraction region. For example, a light extraction region having a relatively large extraction angle may be matched with one or more lens having a relative large radius of curvature, resulting in a relatively smaller angle between the refracted light and a normal line to a surface of the reflective film. The overall reflectivity of the display panel may be further enhanced by having this design.

In another aspect, the present disclosure provides a display apparatus having a display panel described herein. Examples of appropriate display apparatuses include, but are not limited to, an electronic paper, a mobile phone, a tablet computer, a television, a monitor, a notebook computer, a digital album, a gaming system, etc.

In some embodiments, the display apparatus includes a light sensor configured to measure the ambient light intensity, and a controller configured to control the light source (e.g., a LED light source) for the light guide plate. When ambient light intensity is no less than a threshold value, the light sensor transmits a first control signal to the controller. Upon receiving the first control signal, the controller turns off the light source. When the ambient light intensity is below the threshold value, the light sensor transmits a second control signal to the controller. Upon receiving the second control signal, the controller turns on the light source for providing light to the light guide plate.

In some embodiments, the light source (e.g., a LED light source) for the light guide plate may be controlled by other mechanisms or controlled manually. For example, the light source can be turned on and turned off by a user, i.e., the threshold value for turning on and off the light source can be determined by the user. When the user determines that the ambient light intensity is high, the user can manually turn off the light source. When the user determines that the ambient light intensity is low, the user can manually turn on the light source.

In another aspect, the present disclosure provides a method of fabricating a display panel described herein. In some embodiments, the method includes forming a first display substrate having a plurality groups of M pixels, the first display substrate being a reflective display substrate; forming a second display substrate facing the first display substrate, the second display substrate being a transparent display substrate; and forming a lens array layer on a side of the second display substrate distal to the first display substrate. The lens array layer includes a plurality of lenses for directing light reflected by each of the M pixels into one of N view zones on a side of the lens array layer distal to the second display substrate; M is a positive integer ≥2; N is a positive integer ≥2. Optionally, the method further includes forming a liquid crystal layer between the first display substrate and the second display substrate.

Optionally, the step of forming the lens array layer includes forming a first electrode layer and a second electrode layer; and forming an electrically driven liquid crystal lens array layer sandwiched between the first electrode layer and the second electrode layer.

Optionally, the method further includes forming a light guide plate on a side of the second display substrate distal to the first display substrate.

Optionally, the step of forming the light guide plate includes forming a plurality of regions having different light extraction angles in the light guide plate; and the step of forming the lens array layer includes forming a plurality of lenses having different radii of curvature corresponding to the plurality of regions.

In some embodiments, the lens array layer is so formed that incident light from a light source along an incident light direction is refracted by the lens array layer, light transmitted through the lens array layer transmits along a refracted light direction and is subsequently reflected by the first display substrate for image display; and a first angle between the refracted light direction and a normal line to a reflective surface of the first display substrate is smaller than a second angle between the incident light direction and the normal line.

Optionally, M=N, the lens array layer is so formed that the light reflected by each of the M pixels is directed into a corresponding view zone.

Optionally, M=N=2, the first display substrate is formed to have a plurality pairs of adjacent first pixel and second pixel, and the lens array layer is formed to direct light reflected by a first pixel into a first view zone and direct light reflected by a second pixel into a second view zone.

Optionally, the lens array layer is so formed that each lens of the plurality of lenses corresponds to L groups of M pixels, L is an integer ≥1; and that each lens of the plurality of lenses is formed to direct light reflected by a m-th pixel in each of L groups of M pixels into a n-th view zone; 1≤m≤M, and 1≤n≤N.

Optionally, M=N, the lens array layer is so formed that each lens of the plurality of lenses is configured to direct light reflected by a m-th pixel in each of L groups of M pixels into a corresponding view zone; 1≤m≤M.

Optionally, M=N=2; the lens array layer is so formed that each lens of the plurality of lenses corresponds to L groups of a plurality pairs of adjacent first pixel and second pixel, and the lens array layer is formed to direct light reflected by a first pixel in each pair of adjacent first pixel and second pixel in each of the L groups into a first view zone and direct light reflected by a second pixel in each pair of adjacent first pixel and second pixel in each of the L groups into a second view zone.

Optionally, M=N=2, the lens array layer is so formed that each lens of the plurality of lenses corresponds to a plurality pairs of first pixel and second pixel, and each lens of the plurality of lenses is formed to direct light reflected by first pixels in the plurality pairs into a first view zone, and direct light reflected by second pixels in the plurality pairs into a second view zone.

Optionally, L=3, M=N=2, the lens array layer is so formed that each lens of the plurality of lenses corresponds to three pairs of first pixel and second pixel, and each lens of the plurality of lenses is formed to direct light reflected by first pixels in the three pairs of first pixel and second pixel into a first view zone, and direct light reflected by second pixels in the three pairs of first pixel and second pixel into a second view zones.

Optionally, the lens array layer is an electrically driven liquid crystal lens array layer sandwiched between and driven by a first electrode layer and a second electrode layer connected to a driving circuit.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first". "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A three-dimensional display panel, comprising:
a thin film transistor substrate having a plurality groups of M pixels, the thin film transistor substrate comprising a reflective electrode layer;
a counter substrate facing the thin film transistor substrate, the counter substrate being a transparent substrate;
a lens array layer on a side of the counter substrate distal to the thin film transistor substrate comprising a plurality of lenses capable of directing light reflected by each of the M pixels into one of N view zones on a side of the lens array layer distal to the counter substrate; M is an integer ≥2; N is an integer ≥2;
a light guide plate on a side of the lens array layer away from the counter substrate and configured to provide incident light sequentially to the lens array layer and the reflective electrode layer, wherein the light guide plate spans substantially over an entirety of a light emitting side of the lens array layer, and the light guide plate is between the lens array layer and the N view zones; and
a light source on a lateral side of the light guide plate and configured to emit light into the light guide plate;
wherein the lens array layer is configured so that the incident light from the light guide plate along an incident light direction is refracted by the lens array layer, light transmitted through the lens array layer transmits along a refracted light direction and is subsequently reflected by the reflective electrode layer for image display
wherein a respective one of the plurality of lenses corresponds to six pixels;
each of the six pixels comprises a plurality of subpixels of different colors;
the six pixels comprise three first view zone pixels and three second view zone pixels alternately arranged;
the respective one of the plurality of lenses is configured to direct light reflected respectively by the three first view zone pixels into a first view zone, and configured to direct light reflected respectively by the three second view zone pixels into a second view zone.

2. The three-dimensional display panel of claim 1, wherein a first angle between the refracted light direction and a normal line to a reflective surface of the thin film transistor substrate is smaller than a second angle between the incident light direction and the normal line.

3. The three-dimensional display panel of claim 1, wherein the lens array layer is an electrically driven liquid crystal lens array layer sandwiched between and driven by a first electrode layer and a second electrode layer connected to a driving circuit.

4. The three-dimensional display panel of claim 1, wherein the light guide plate comprises a plurality of regions having different light extraction angles; and
the lens array layer comprises a plurality of lenses having different radii of curvature corresponding to the plurality of regions having different light extraction angles.

5. The three-dimensional display panel of claim 1, wherein the three-dimensional display panel is configured to use ambient light for providing incident light to the thin film transistor substrate when ambient light intensity is equal to or higher than a threshold value, and use the light guide plate for providing incident light to the thin film transistor substrate when ambient light intensity is below the threshold value.

6. The three-dimensional display panel of claim 1, wherein a respective one of the M pixels comprises a single subpixel.

7. The three-dimensional display panel of claim 1, wherein a respective one of the plurality of lenses has a radius of curvature r according to a following equation:

$$r = \frac{tl(n_2 - n_1)}{n_1 e};$$

wherein t is a pixel width of a respective one of the M pixels; l is a normal distance between the N view zones and the lens array layer; e is a distance between two adjacent view zones; $n_1$ is a refractive index of a respective one of the plurality of lenses; and $n_2$ is a refractive index of a medium on a side of the lens array layer distal to the counter substrate.

8. The three-dimensional display panel of claim 1, wherein a respective one of the plurality of lenses has a lens pitch p according to a following equation:

$$\frac{N*e*t}{e+t} - \frac{(N*e*t^2)/w}{e+t} < p < \frac{N*e*t}{e+t} + \frac{(N*e*t^2)/w}{e+t}$$

wherein e is a distance between two adjacent view zones; t is a pixel width of a respective one of the M pixels; and w is a width of the plurality groups of M pixels.

9. The three-dimensional display panel of claim 8, wherein the respective one of the plurality of lenses has a lens pitch p according to a following equation:

$$p = \frac{N*e*t}{e+t}$$

wherein e is a distance between two adjacent view zones; and t is a pixel width of the respective one of the M pixels.

10. The three-dimensional display panel of claim 1, wherein a respective one of the plurality of lenses has a thickness d according to a following equation;

$$d = \frac{n_2 r}{n_2 - n_1} - \frac{n_2 s}{n_1};$$

wherein r is a radius of curvature of the respective one of the plurality of lenses; s is a normal distance between the lens array layer and the thin film transistor substrate; $n_1$ is a refractive index of the respective one of the plurality of lenses; and $n_2$ is a refractive index of a medium on a side of the lens array layer distal to the counter substrate.

11. A three-dimensional display apparatus, comprising a three-dimensional display panel of claim 1.

\* \* \* \* \*